US009798674B2

(12) United States Patent
Steiss

(10) Patent No.: US 9,798,674 B2
(45) Date of Patent: Oct. 24, 2017

(54) N-ARY TREE FOR MAPPING A VIRTUAL MEMORY SPACE

(71) Applicant: Cisco Technology, Inc., San Jose, CA (US)

(72) Inventor: Donald Edward Steiss, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 14/568,486

(22) Filed: Dec. 12, 2014

(65) Prior Publication Data
US 2016/0170896 A1 Jun. 16, 2016

(51) Int. Cl.
G06F 12/10 (2016.01)
G06F 12/109 (2016.01)

(52) U.S. Cl.
CPC .... *G06F 12/109* (2013.01); *G06F 2212/1016* (2013.01); *G06F 2212/152* (2013.01); *G06F 2212/657* (2013.01)

(58) Field of Classification Search
CPC ............... G06F 12/19; G06F 12/109; G06F 2212/1016; G06F 2212/152; G06F 2212/657
USPC ............. 711/154, 202, 206, 12.058, 12.066, 711/12.095
See application file for complete search history.

(56) References Cited

U.S. PATENT DOCUMENTS

| 5,652,854 A | | 7/1997 | Wong | |
|---|---|---|---|---|
| 6,085,296 A | * | 7/2000 | Karkhanis | G06F 12/1009 711/147 |
| 7,330,958 B2 | | 2/2008 | Davis | |
| 7,360,064 B1 | | 4/2008 | Steiss et al. | |
| 8,156,309 B2 | | 4/2012 | Steiss | |
| 8,566,536 B1 | * | 10/2013 | Brightwell | G06F 9/544 711/147 |
| 9,086,973 B2 | * | 7/2015 | Vorbach | G06F 9/526 |
| 2005/0050295 A1 | | 3/2005 | Noel et al. | |
| 2008/0140897 A1 | * | 6/2008 | Ganguly | G06F 12/1027 710/268 |

(Continued)

OTHER PUBLICATIONS

Meagher, Donald, Geometric Modeling Using Octree Encoding, Computer Graphics and Image Processing 19, pp. 129-147, 1982, Academic Press, Inc., Waltham, United States.

(Continued)

*Primary Examiner* — Mark Giardino, Jr.
*Assistant Examiner* — Edward Waddy, Jr.
(74) *Attorney, Agent, or Firm* — Patterson + Sheridan, LLP

(57) ABSTRACT

A page table is a data structure used by a virtual memory system in a computer system to store the mapping between virtual addresses and physical addresses. Embodiments herein use a tree to map a virtual memory address space in the page table. The tree may be an N-ary tree where N is a power of two (e.g., 2, 4, 8, 16, etc.). The tree may include multiple levels that each correspond to a different page table size. For example, an octree includes eight different entries for each child node which may include per-thread sub-entries. Child nodes in the first level of the octree may each correspond to a 512 GiB page, while child nodes in the second level, however, may each have eight entries that correspond to a 64 GiB page. In this manner, an N-ary tree may be used to support a computing system with varying page sizes.

17 Claims, 7 Drawing Sheets

(56) References Cited

U.S. PATENT DOCUMENTS

| 2008/0141266 | A1* | 6/2008 | Hunt | G06F 21/562 |
| | | | | 718/106 |
| 2009/0182976 | A1* | 7/2009 | Agesen | G06F 12/1009 |
| | | | | 711/207 |
| 2011/0219208 | A1* | 9/2011 | Asaad | G06F 15/76 |
| | | | | 712/12 |
| 2013/0262817 | A1* | 10/2013 | Bybell | G06F 12/1018 |
| | | | | 711/208 |

OTHER PUBLICATIONS

Szmajda, Cristan, A New Virtual Memory Implementation for L4/MIPS, Undergraduate Thesis for the School of Computer Science and Engineering, Nov. 2, 1999, School of Computer Science and Engineering, University of New South Wales, Sydney, Australia.

* cited by examiner

N-ARY TREE FOR MAPPING A VIRTUAL MEMORY SPACE

TECHNICAL FIELD

Embodiments presented in this disclosure generally relate to page tables for performing virtual to physical memory translations. More specifically, embodiments disclosed herein relate to mapping the page tables using N-ary tree structures.

BACKGROUND

Multithreaded multi-core processors are widely used as network processors. Typical packet processing activities are well suited for this style of processor given the available process-level parallelism that exists in packetized communication systems. For this reasons, the performance of a multithreaded multi-core processor on packet processing tasks is dependent upon the number of cores in the multi-core processor and the number threads on each processor.

Since the number of cores affects performance but also increases the area and cost of the processor, it is desirable to make the individual cores as small as possible without degrading their performance. Furthermore, reducing the size of the core may also reduce the cost of the processors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
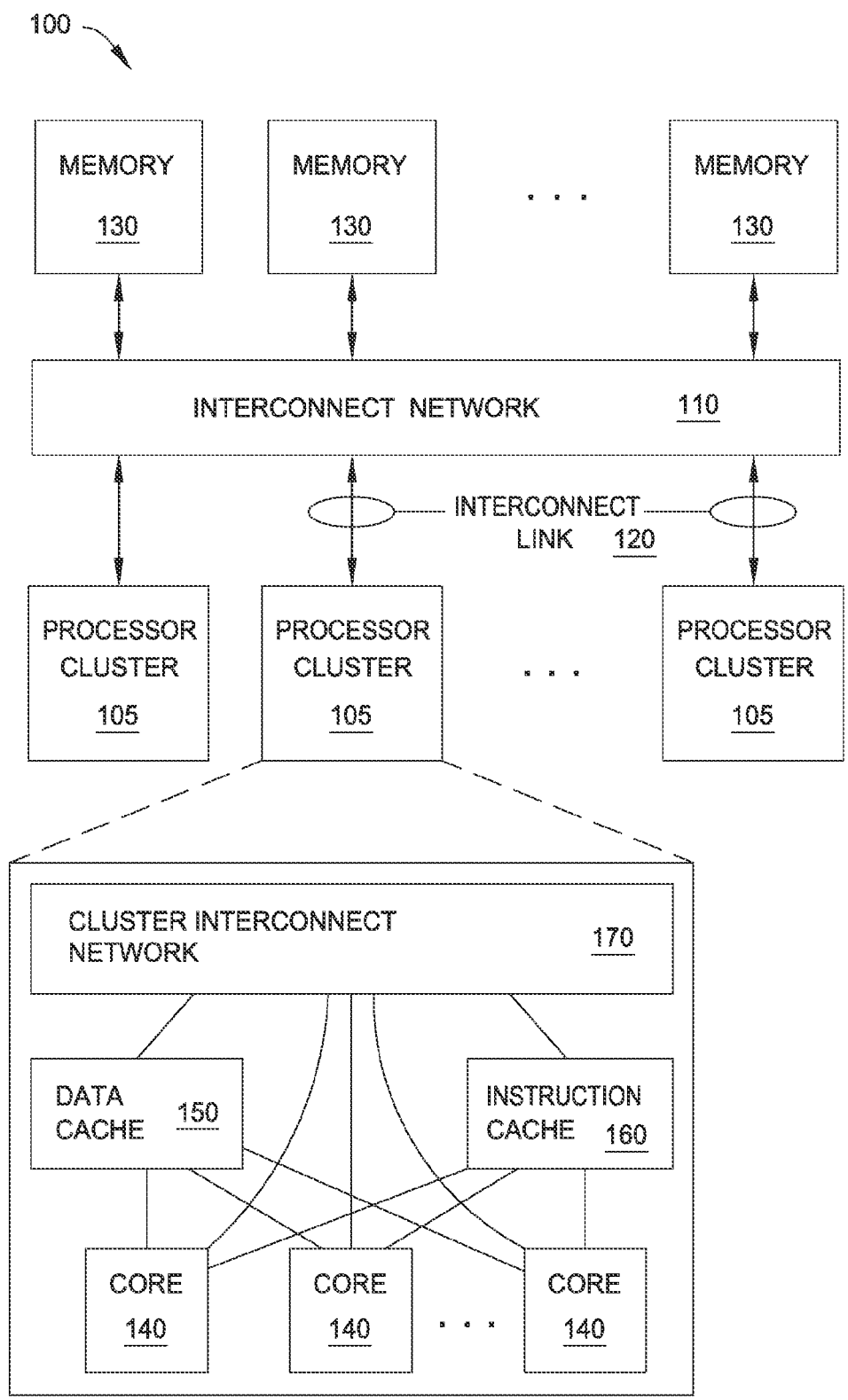
FIG. 1 is a block diagram of a multi-core processor in a network device, according to one embodiment described herein.

One embodiment presented in this disclosure is a memory management unit (MMU) configured to translate a virtual memory address to a physical memory address. The MMU includes control logic configured to access a root entry of an N-ary tree that maps the virtual memory address to a virtual address space, where N is a power of two, and access one of an N number of entries in a first child node of the N-ary tree based on the virtual memory address and information stored in the root entry. Upon determining the one entry is a leaf entry, the control logic updates the MMU with information stored in the leaf entry to enable the MMU to translate the virtual memory address into the physical memory address. The control logic also includes, upon determining the one entry is a directory entry, access one of an N number of entries in a second child node of the N-ary tree based on the virtual memory address and information stored in the directory entry.

Another embodiment presented herein is method that includes receiving a request to translate a virtual memory address to a physical memory address and accessing a root entry of an N-ary tree that maps the virtual memory address to a virtual address space where N is a power of two. The method also includes accessing one of an N number of entries in a first child node of the N-ary tree based on the virtual memory address and information stored in the root entry. Upon determining the one entry is a leaf entry, the method updates an MMU with information stored in the leaf entry to enable the MMU to translate the virtual memory address into the physical memory address. Upon determining the one entry is a directory entry, the method accesses one of an N number of entries in a second child node of the N-ary tree based on the virtual memory address and information stored in the directory entry.

Another embodiment presented herein is a computer program product that includes computer-readable program code configured to receive a request to translate a virtual memory address to a physical memory address and access a root entry of an N-ary tree that maps the virtual memory address to a virtual address space, where N is a power of two. The computer-readable program code is configured to access one of an N number of entries in a first child node of the N-ary tree based on the virtual memory address and information stored in the root entry. Upon determining the one entry is a leaf entry, the computer-readable program code is configured to update an MMU with information stored in the leaf entry to enable the MMU to translate the virtual memory address into the physical memory address. Upon determining the one entry is a directory entry, the computer-readable program code is configured to access one of an N number of entries in a second child node of the N-ary tree based on the virtual memory address and information stored in the directory entry. The computer program product includes a computer readable medium that stores the computer-readable program code.

Example Embodiments

A page table is a data structure used by a virtual memory system in a computing system to store the mapping between virtual addresses and physical addresses. Virtual addresses are used by the accessing process (e.g., a software application), while physical addresses are used by the hardware. Embodiments herein use a tree data structure to represent a virtual memory space of the page table. The tree may be an N-ary tree where N is a power of two (e.g., 2, 4, 8, 16, etc.). The tree may include multiple levels that each correspond to a different page table size. For example, an octal tree (referred to herein as an octree) includes eight different entries for each child node. For the child nodes in the first (top) level of the octree, each entry corresponds to, for example, a 512 GiB page. For child nodes in the second level, however, each of the eight entries may correspond to a 64 GiB page.

In one embodiment, the entries in the child nodes are either leaf entries or directory entries. When a leaf entry is reached, the traversal of the tree terminates. The computing system then uses the information stored in the leaf entry to identify a physical memory address corresponding to a virtual memory address being used to traverse the N-ary tree. However, if a directory entry is reached, the computing system uses the information stored in this entry to identify a child node in the next level of the tree. This traversal continues down through the tree until a leaf entry is reached.

Processors may contain one or more threads where the identity of a thread is known to the thread and other parts of the system by a thread identifier commonly called a thread ID. In a multithreaded processor, the various threads may be assigned specific virtual pages (and the corresponding physical address) that cannot be accessed by other threads. That is, instead of the threads sharing the same virtual memory space, one or more threads may be assigned different portions of the memory. For example, when a directory entry is reached, the child node referenced by the directory entry may include different entries for the threads (referred to herein as "sub-entries"). Using a thread ID, the computer system identifies which sub-entry corresponds to which thread. In this manner, the tree can provide a specific portion of virtual address space to a specific thread. Furthermore, the computing system may include a multiple trees for mapping the virtual memory space (e.g., different processors in a multi-processor computing device may correspond to different trees). However, a directory entry in one tree may reference a child node in the other tree where the processors share the same virtual to physical mappings. Because in some situations, multiple processors may share, for example, the same code space or lookup table spaces, memory consumption for the page table may be reduced when directory entries in one tree point to a child node in another tree relative to a computer system where the processors each maintain an independent tree.

FIG. 1 is a block diagram of a multi-core processor 100 in a network device, according to one embodiment described herein. In one embodiment, multiple processors 100 may be used in a network device such as a router to forward packets between computing devices—e.g., servers, other network devices, and the like. However, the embodiments disclosed herein may be used in any computing system that includes a page table for performing virtual to physical memory translations.

Processor 100 includes multiple processor clusters 105 that contain multiple processor cores 140. The processor clusters 105 also include data cache 150, instruction cache 160, and a cluster interconnect network 170. The cores 140 in the processor clusters 105 each connect to the data cache 150, instruction cache 160, and the network 170 to perform data and ordering transactions.

The processor clusters 105 communicate with each other and the memory elements 130 using the interconnect network 110. In one embodiment, the memory elements 130 may be memory accelerators. Interconnect links 120 may include one or more busses to convey information between the processor clusters 105 and the interconnect network 110. The interconnect network 110 may include crossbars, slotted rings, or other multi-port switching network topology.

Memory elements 130 respond to commands received from the interconnect network 110 and perform memory operations that may include basic read/write instructions as well as indivisible read, modify, and write (RMW) sequences. In one embodiment, memory elements 130 may be specialized to perform domain-specific operations rather than memory operations. For example, one memory element 130 may perform cryptographic or prefix lookup operations.

Figure 2:
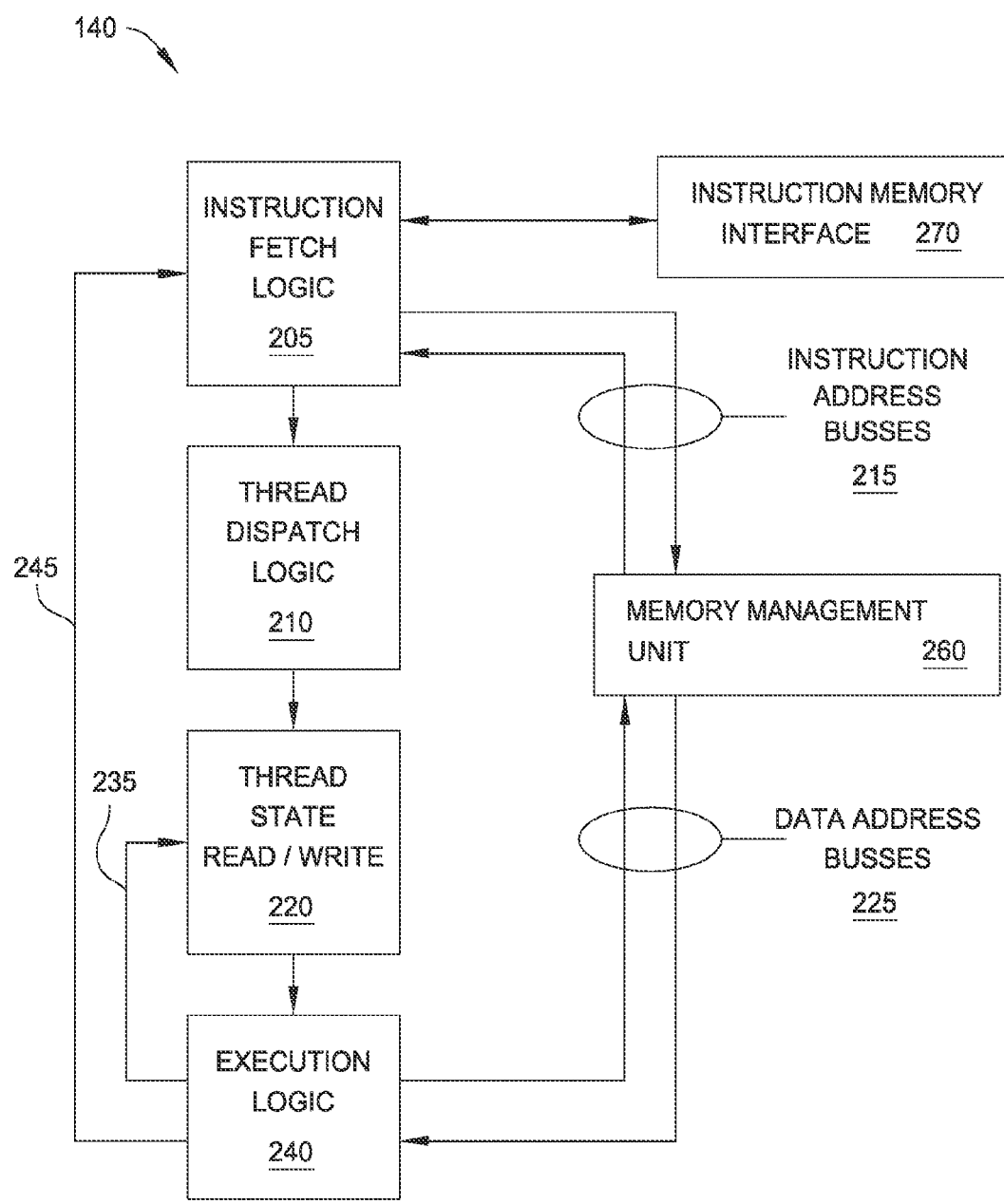
FIG. 2 is a block diagram of a core in a processor, according to one embodiment disclosed herein.

FIG. 2 is a block diagram of a core 140 in a processor, according to one embodiment disclosed herein. As shown, core 140 includes instruction fetch logic 105 which obtains instructions either from a cache inside Instruction Fetch Logic 205 or through an instruction memory interface 270. In one embodiment, instruction fetch logic 205 operates in a virtual address space and uses instruction address busses 215 to send requests to a memory management unit (MMU) 260 to transform virtual addresses into physical addresses which are used by the instruction memory interface 270 to, for example, access main memory.

Decoded instructions from instruction fetch logic 205 are queued in thread dispatch logic 210 which arbitrates between the threads assigned to the core 140 to select one for execution. The information about the selected thread and instruction to be executed is sent to a thread state read/write circuit 220. To execute the received instruction, the thread state read/write circuit 220 sends operands from the selected thread to execution logic 240 which may include logic to, for example, perform register-to-register arithmetic operations, shift operations and logical operations, evaluate branch/jump operations, evaluate load and store instructions, perform asynchronous transactions with memory or special purpose processing elements, and the like. The execution logic 240 uses data path 235 to return results to the thread state read/write circuit 220 and update the thread state in order to execute subsequent instructions for the thread. If branch and jump operations change the flow of the executing thread, execution logic 240 communicates these changes to the instruction fetch logic 100 using data path 245.

In one embodiment, execution logic 240 produces virtual memory addresses which are transmitted to MMU 260 using data address busses 225 for translation into physical addresses. Furthermore, execution logic 240 may contain a first-level data cache. If this cache does not include the data required to perform the instruction, the execution logic 240 may use a data memory interface (not shown) to access the required data from another cache or main memory.

MMU 260 translates virtual addresses received using the instruction and data address busses 215, 225 to physical addresses. MMU 260 may perform this translation by identifying a virtual address page containing a given virtual address and then replacing a subset of the bits (and extending the number of bits) in the virtual address to form a physical address. To do so, MMU 160 uses information stored in a physical address page corresponding to the virtual address page. This process is described in more detail in FIG. 3. Translation Lookaside Buffers (TLBs) or Content Addressable Memories (CAMs) are often used to associate a virtual address with a virtual address page and a physical address page.

Figure 3:
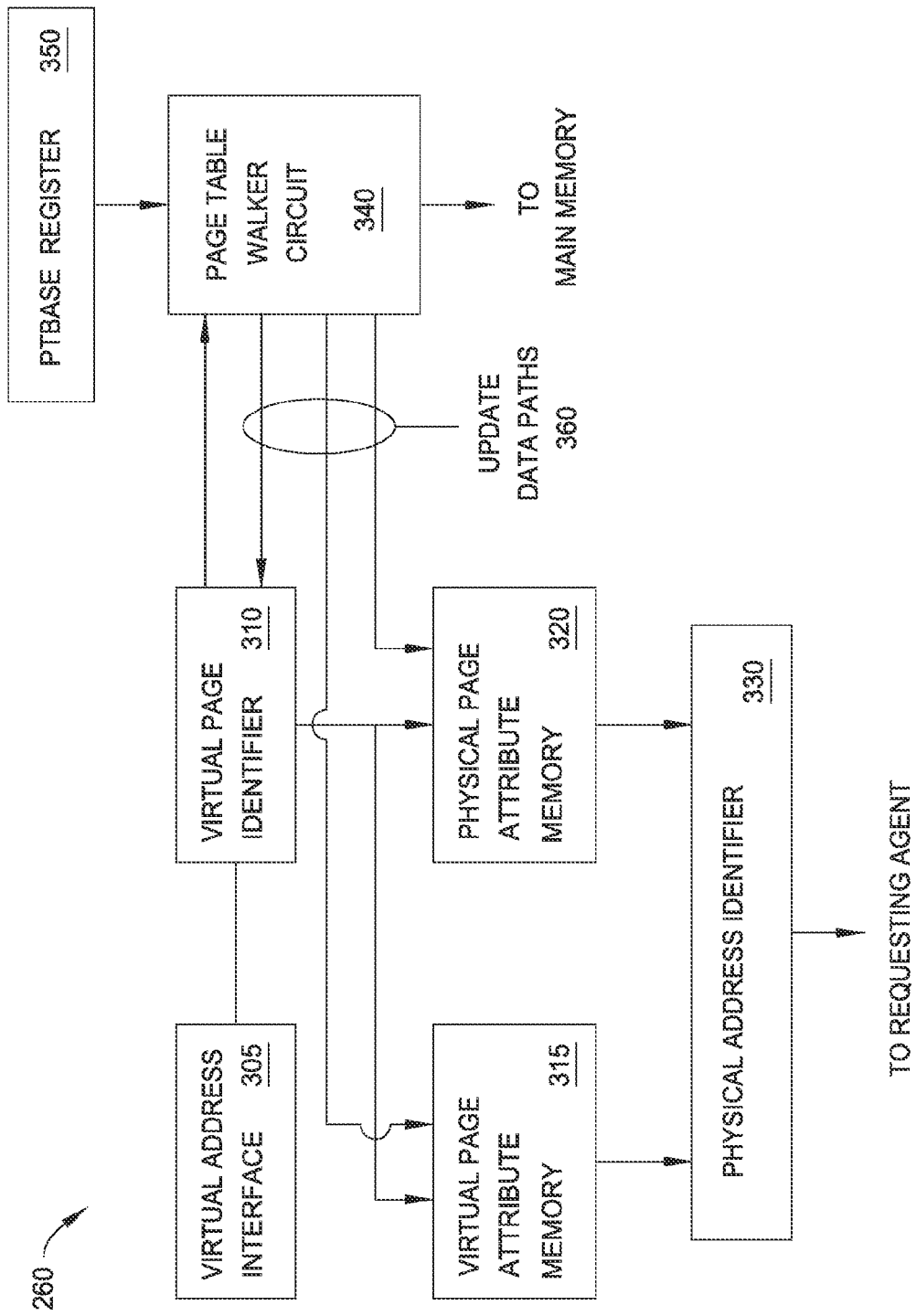
FIG. 3 illustrates a block diagram of a memory management unit in a core, according to one embodiment described herein.

FIG. 3 illustrates a block diagram of MMU 260, according to one embodiment described herein. In one embodiment, to conserve chip area, the MMU 260 only stores information about a recently-used subset of the address space. In many situations, a small number of memory pages account for the majority of memory access, which is especially true in network processing applications. The information about the remaining ranges of the address space not stored in the MMU 260 may be stored in main memory.

The virtual memory addresses are received at the MMU 260 using the virtual address interface 305. For example, the virtual address interface 305 may be connected to the instruction and data address busses 215, 225 illustrated in FIG. 2. A virtual page identifier 310 receives the virtual memory address to determine if the address corresponds to a known virtual memory page. If a matching virtual memory page is found, the virtual page identifier 310 transmits an entry number of the virtual memory page to the virtual page attribute memory 315 and the physical page attribute memory 320. In one embodiment, the virtual page identifier 310 may include a CAM for identifying the entry number of the virtual memory page using the received virtual memory address.

The virtual page attribute memory 315 and physical page attribute memory 320 use the entry number to access memory locations containing information about the virtual memory page and physical memory page, respectively. These locations in the memories 315 and 320 may include information regarding access permissions, memory ordering controls, the page size, and the physical page number. The information retrieved from the virtual page attribute memory 315 and the physical page attribute memory 320 is forwarded to a physical address identifier 330 which uses this information, along with the received virtual memory address, to output the corresponding physical memory address. This address, and the attribute information retrieved from the memories 315 and 320, are then forwarded to the agent who transmitted the virtual memory address—e.g., the instruction fetch logic 205 or execution logic 240 shown in FIG. 2. In this manner, the MMU 260 may perform a virtual to physical address translation for an instruction address or a data address. However, FIG. 3 is only one implementation of a MMU for performing virtual to memory address translation. The embodiments described herein may be used with other MMU arrangements.

When a virtual address page corresponding to a received virtual memory address cannot be identified, the virtual page identifier 310 transmits a miss indication signal to a page table walker circuit 340. In one embodiment, the page table walker circuit 340 includes a finite state machine (e.g., control logic) that accesses a data structure representing the virtual to physical page mappings of the virtual address space. As will be described in more detail below, this data structure of the virtual to physical page mappings may be an N-ary tree where N is a power of two. The physical address of the start of the data structure in memory provided by the page table base (PTBASE) register 350. If an N-ary tree is used to represent the page table, the PTBASE register 350 stores the location of the root node of the N-ary tree in, for example, main memory. By traversing (i.e., "walking") the N-ary tree, the page table walker circuit 340 identifies the missing virtual address page corresponding to the received virtual memory address and updates the virtual page identifier 310. A more detailed description of the N-ary tree and how the walker circuit 340 traverses this data structure is provided in the figures below.

In addition to identifying the virtual address page using the N-ary tree, the page table walker circuit 340 may also retrieve information from the N-ary tree to store attribute information corresponding to the received virtual memory address in the virtual and physical page attribute memories 315, 320. In this manner, the page table walker circuit 340 is able to update the MMU 260 using the update data paths 360 to perform a virtual to physical address translation for a virtual memory address not currently known to the virtual page identifier 310 and the memories 315 and 320.

Figure 4:
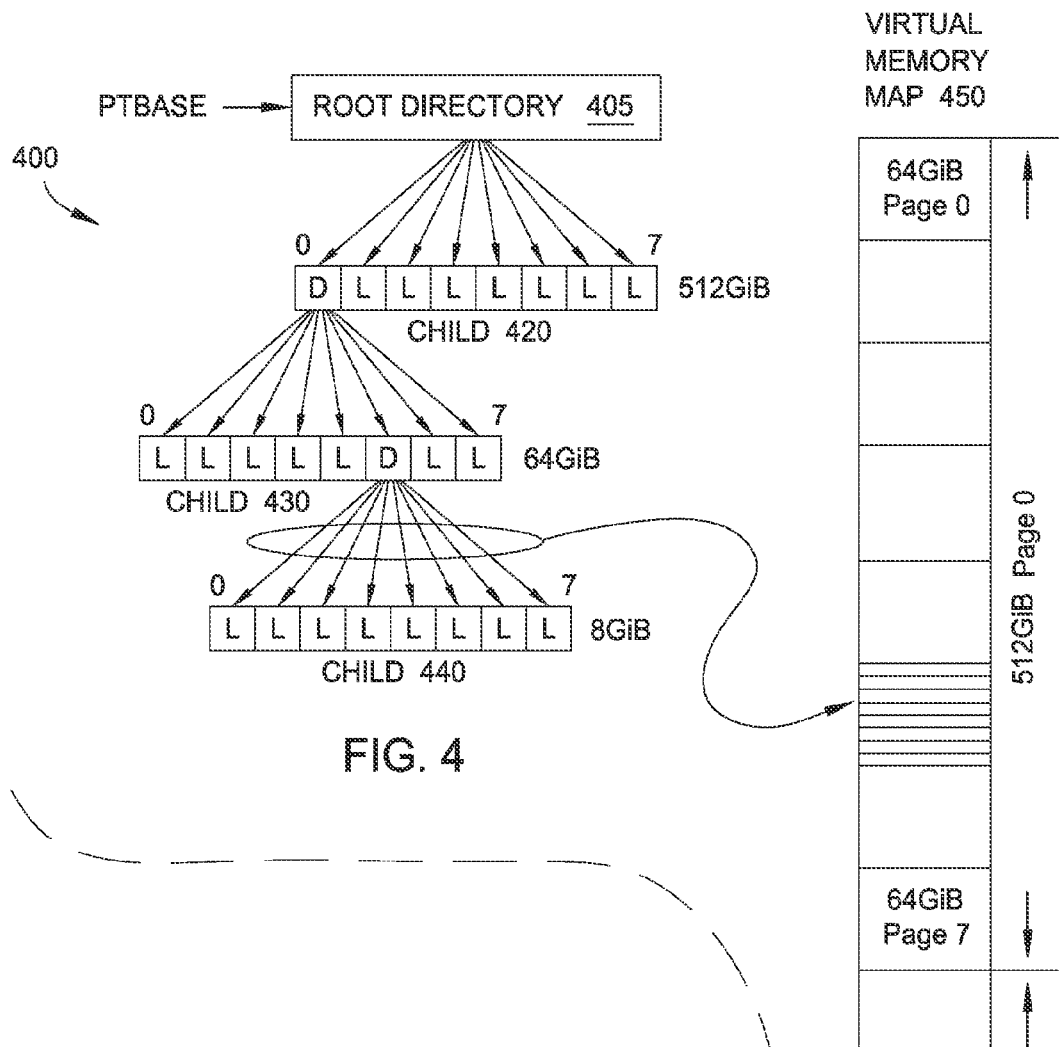
FIG. 4 illustrates an octree used for mapping a virtual memory space, according to one embodiment described herein.

FIG. 4 illustrates an octree 400 used for mapping a virtual address space, according to one embodiment described herein. Although the examples and embodiments described below illustrate an octree to map a virtual address space to a physical address space, the tree may be arranged according to any power of two—e.g., a binary tree, quaternary tree, octree, etc. As the number of entries in the child nodes of the tree increases, the number of contiguous pages increases. In the case of an octree, each child node maps to eight contiguous or sequential physical address pages. Each child node in a binary tree, however, maps to only two contiguous physical pages. In contrast, as the number of entries in the child nodes increases, the number of variable page sizes that can be represented in the tree decreases. Stated differently, as the number of entries increases, the tree becomes flatter (i.e., has fewer levels) which limits the variety of page table sizes that can be mapped by the tree. As such, there is a tradeoff between the different N-ary trees where different trees may be better suited for different computer systems.

The octree 400 is used to map received virtual addresses to a corresponding virtual memory map 450 (also referred to as a virtual address space). The octree 400 includes a root directory 405 and child nodes 420, 430, and 440. In this example, the virtual memory map 450 occupies a total of 4 TiB and can be addressed using 42 address bits (e.g., $2^{42}$ is approximately 4 TiB). The virtual memory map 450 is subdivided into eight 512 GiB pages. The octree 400 includes root directory 405 whose location in memory may be stored in the PTBASE register 350 shown in FIG. 3 so that the page table walker circuit 340 can identify the root directory 405. The walker circuit 340 then uses the received virtual memory address to the traverse the octree 400 which in turn identifies the corresponding physical address page.

In one embodiment, to traverse the octree 400, the walker circuit uses the three most significant bits of the virtual memory address (e.g., bits 41:39 of a 42 bit virtual memory address) to select one of the eight entries in the child node 420 which each correspond to one of the eight 512 GiB pages in the virtual memory map 450. As shown, each entry is characterized as a directory entry "D" or a leaf entry "L." If the three bits in the virtual memory address map to the directory entry in child node 420, the page table walker circuit identifies a child node in the next level of the octree 400—e.g., child node 430. Although child node 420 only includes one directory entry, in other examples, the node 420 may include multiple directory entries that map to respective child nodes. In this case, these child nodes would be at the same level in octree 400 as child node 430.

To identify the location of child node 430 in memory, the directory entry (i.e., Entry 0) in child node 420 stores information such as a memory offset that the walker circuit can use to derive the physical address of child node 430 in memory. As shown, child node 430 also includes eight entries which subdivide the 512 GiB page corresponding to Entry 0 in child 420 into eight 64 GiB virtual memory pages. To identify which of the eight entries in child node 430 corresponds to the received virtual memory address, the page table walker circuit may evaluate the next three most significant bits of the address—i.e., bits 38:36. These three bits point to exactly one of the eight entries in child node 430. In this embodiment, the bits of the virtual memory address are used to traverse down the octree 400 to identify a particular entry in a child node at each of the levels until a leaf entry is reached. Once the leaf entry is encountered, the page table walker circuit has identified its destination and ceases to traverse the octree 340. For octree 400 there is a maximum of 14 levels where each level (and the child node(s) within that level) maps to a different size of virtual memory pages. Of course, the octree 400 may not have child nodes at fourteen levels. For example, if a minimum virtual memory page size of 8 GiB is desired, then the octree 400 may have child nodes only at four levels. Assuming the received virtual memory address maps to a directory entry at each level, bits 41:39 identify an entry in a child node in the first (i.e., upper) level, bits 38:36 identify an entry in a child node in the second level, bits 35:33 identify an entry in a child node in the third level, and so forth.

Once the page table walker circuit maps the bits of the received virtual memory address to a leaf entry, the circuit identifies the corresponding virtual memory page stored in the virtual memory map 450. For example, child node 440 includes eight leaf directories that each correspond to a respective 8 GiB virtual memory page. To identify the virtual memory pages, the leaf directories may store, for example, a beginning address of the 8 GiB pages which the page table walker circuit can use to retrieve the page from the virtual memory map 450 if desired. In this manner, the octree 400 provides multiple levels where each level includes one or more child nodes that subdivide the virtual memory page of an entry in a upper child in the hierarchical structure. As shown here, the entries of child node 430 subdivide the virtual memory page of Entry 0 in child node 420 while the entries of child node 440 subdivide the virtual memory page of Entry 5 in child node 430. By using an N-ary tree such as octree 400 that includes directory and leaf entries, the computing system is able to assign different sized virtual memory pages to different applications executing on the computing system using the virtual memory address which may be a more efficient use of memory relative to dividing the virtual memory map 450 into virtual memory pages that are all the same size.

When a leaf entry is reached and the corresponding virtual memory page is identified, the page size of this virtual memory page determines the page size to be used for mapping the original virtual address to a physical address. The page table walker circuit can then forward information corresponding to the virtual memory page to other components in the MMU (e.g., the virtual page identifier) to be used to identify a physical memory address corresponding to the virtual memory address.

Figure 5A:
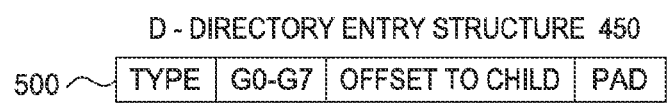
FIGS. 5A and 5B illustrate information stored in leaf and directory entries in a child node of the octree, according to embodiments described herein.
Figure 5B:
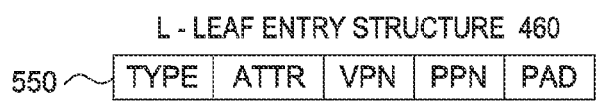

FIGS. 5A and 5B illustrate information stored in leaf and directory entries in a child node of the octree, according to embodiments described herein. In FIG. 5A, the directory entry structure 500 includes a TYPE field that contains a code to distinguish the directory entry structure from the leaf entry structure. Stated differently, the TYPE field identifies the entry as either a directory entry or a leaf entry. In one embodiment, the TYPE field has the same offset from the beginning of the directory and leaf entries for the two structures 500 and 550 so that the page table walker circuit can use the same offset on all the entries in order to identify the entries as either directory or leaf entries.

The G0-G7 field contains 8-bits that determine if the child entries of the directory entry are either processor-global or per-thread. That is, the entries may be shared by all the threads executing on the processor or the only for specific threads. For example, a logical one may indicate an entry is shared by all threads while a logical zero indicates only a certain thread (or threads) may access the virtual memory page associated with the entry. This will be described in more detail in FIG. 6.

The OFFSET TO CHILD field is an offset in physical address space to the child entry. The page table walker circuit may use the value in this field to identify the child node in the subsequent level in the octree. For example, referring back to FIG. 4, the OFFSET TO CHILD field in Directory Entry 0 of child node 420 includes an offset value that points the page table walker circuit to the location of child node 430 in physical memory (e.g., main memory). The PAD field may include one or more bits that are unused to round up the size of the directory entry structure 500 to a power-of-two and match the size of the leaf entry structure 550.

In FIG. 5B, the leaf entry structure 550 illustrates the different fields in the leaf entries in an N-ary tree. The TYPE field contains a code to identify the structure 550 as a leaf entry rather than a directory entry. The ATTR field includes one or more bits that specify permissions or memory ordering properties of the virtual memory page that correspond to the leaf entry. The page table walker circuit may forward the information in the ATTR field to the virtual page attribute memory 315 and physical page attribute memory 320 shown in FIG. 3 which may use the information to perform the virtual to physical memory translation in the MMU 260.

The PPN field is the physical address number and replaces a range of virtual address bits when converting a virtual address to a physical address. This information may be sent and stored in the physical page attribute memory 320 and is used to replace the virtual address bits above the in-page offset with the physical page number when performing the virtual to physical memory translation.

The PAD field in the leaf entry structure 550 may be contain enough bits to round up the size of the structure 550 to a power-of two and match the size of the directory entry structure 500. Thus, even though the two structures 500, 550 may contain different amounts of information, the respective PAD fields may be used to ensure the structures 500, 550 have the same total bit length. Moreover, by constructing the leaf and directory entries to have the same size and to contain a power-of-two number of bytes, the calculation to identify the location of the child in next level (when a directory entry is reached) is simplified.

Although not shown in FIGS. 5A and 5B, the leaf and directory structures 500 and 550 may include one or more fields for performing error checking. For example, the data stored in the fields may be used to detect transient errors or errors as a result of incorrect octree construction.

Figure 6:
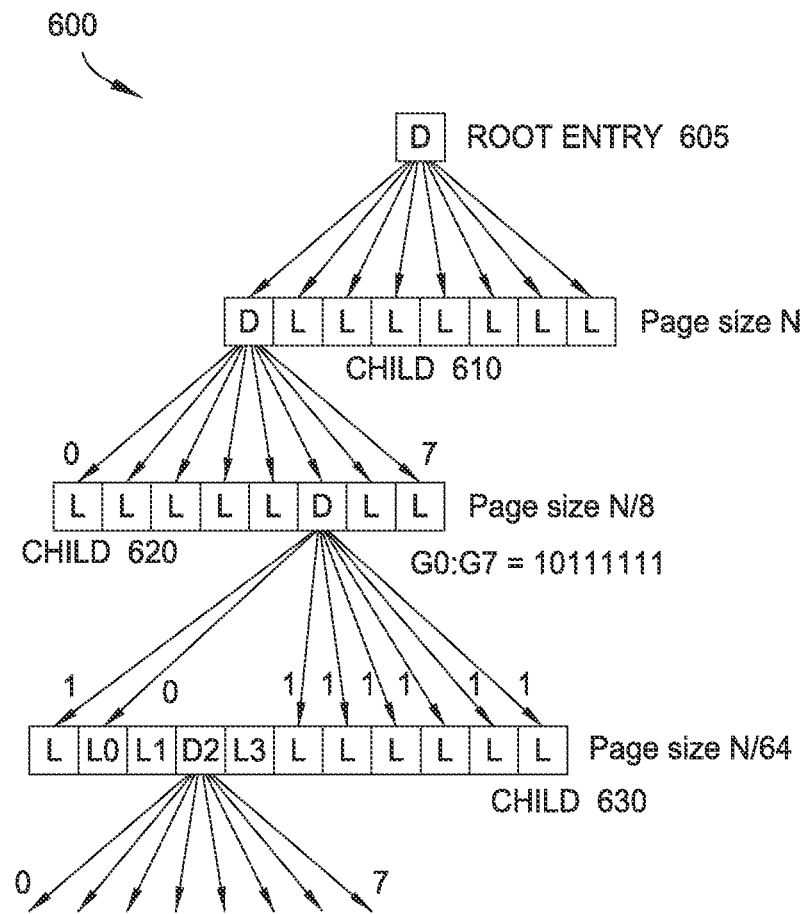
FIG. 6 illustrates an octree 600 with entries that are extended with per-thread sub-entries, according to one embodiment described herein.

FIG. 6 illustrates an octree 600 with entries that are extended with per-thread sub-entries, according to one embodiment described herein. Unlike in FIG. 4 where the G0-G7 values of the directory entries indicated the entries in the child node are global to all threads in the processor, here, at least one of the directory entries indicates that one of the directory or leaf entries in the corresponding child node include at least one "sub-entries" that is private to a specific thread in the processor. However, in one embodiment, the sub-entries may be common to a group or a sub-set of the threads rather than only one thread.

As shown, octree 600 includes three child nodes under the root entry 605: child node 610, 620, and 630. Entry 5 of child node 620 is a directory entry where the bit G1 is set to a logical zero rather than a logical one. This logical zero indicates that the corresponding child node referenced by the directory entry (i.e., child node 630) has one or more sub-entries at Entry 1 that are private to specific threads. That is, the G0-G7 bits of the directory entry in child node 620 correspond respectively to Entry 0-Entry 7 in child node 630. Thus, if G0 were a logical zero rather than a logical one, this means that Entry 0 of child node 630 would include one or more sub-entries that are for specific threads.

In this example, Entry 1 of child node 630 includes four private sub-entries that each may correspond to a specific thread in the processor. That is, instead of Entry 1 mapping to one N/64 virtual memory page (where N is the total size of the virtual memory map), Entry 1 includes four sub-entries that each correspond to a separate N/64 virtual memory page. The sub-entries are also categorized as a directory entry or a leaf entry and may contain the same information as the structures 500, 550 shown in FIGS. 5A and 5B. Here, Entry 1 of child node 630 includes three leaf sub-entries and one directory sub-entry that correspond to four different threads executing in the processor, respectively. When traversing octree 600, the virtual memory address for these four threads all map to Entry 1 of child node 630. However, to select which of the sub-entries corresponds to the virtual memory address, the page table walker circuit may use an ID of the thread that issued the virtual memory address. For example, if Thread A transmitted the virtual memory address to the MMU, then the corresponding ID for thread A may be used to index into Entry 1 of child node 630 and identify one of the sub-entries. In this manner, the octree 600 can be used to generate global and per-thread mappings for the threads executing in the processor. Moreover, the different mappings may be accessed using the same parent directory, i.e., root entry 605.

Figure 7:
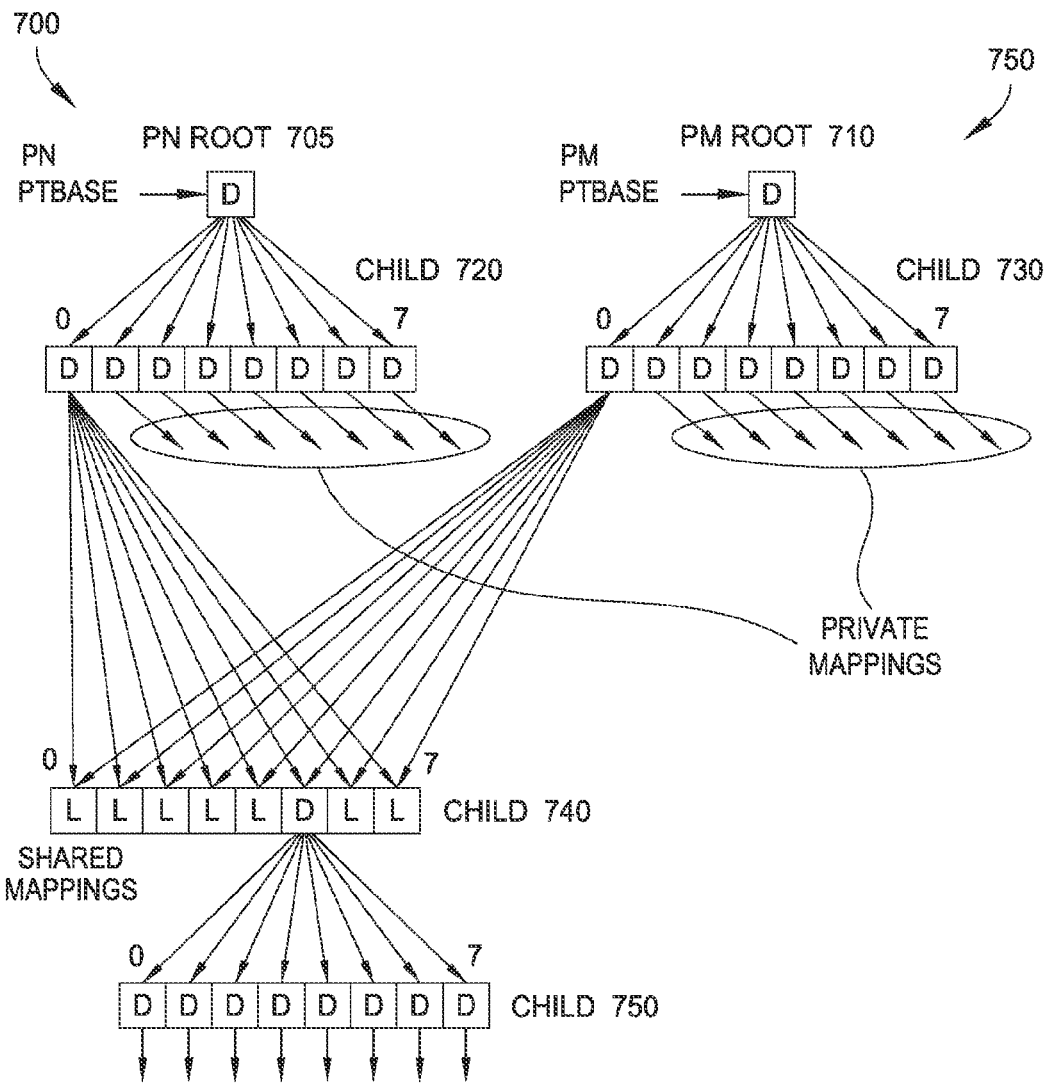
FIG. 7 illustrates two octrees with shared mappings, according to one embodiment described herein.

FIG. 7 illustrates two octrees 700, 750 with shared mappings, according to one embodiment described herein. For example, FIG. 7 includes octree 700 for Processor A and octree 750 for Processor B where Processors A and B are in the same multi-processor computing system. The two processors may include separate PTBASE registers where the register for Processor A stores the physical address of Pn root 705 in main memory and the register for Processor B stores the physical address of Pm root 710 in main memory. As such, the processors points to independent root entries 705, 710 for the two octrees 700, 750. In turn, the root entries 705 and 710 point respectively to independent child nodes 720 and 730.

Both child node 720 and child node 730 include a directory entry (i.e., Entry 0) that points to child node 740. As such, child node 740 represents a portion of the virtual address space or map where both Processor A and Processor B share the same virtual to physical mappings. The other entries in child nodes 720 and 730 map to private mapping that are accessed only by threads executing on the specific processors. That is, only the threads that access octree 705 on Processor A are able to access the child nodes corresponding to Entries 1-7 in child node 720 while only the threads that access octree 710 on Processor B are able to access the child nodes corresponding to Entries 1-7 in child node 730. Thus, if the threads on the two separate processors do not share memory, then their virtual memory pages are mapped using the private mappings. However, if the threads on the separate processors do share memory, then the virtual memory pages are mapped to a portion where the two octrees 700, 750 have converged. To permit the components on different processors to access the shared or converged portion, the octrees 700 and 750 may be stored in memory that is accessible to both processors (e.g., main memory in the computing device). Once the octree traversal reaches child node 640, the traversal can continue to child node 650 through Entry 5 regardless of whether a thread on Processor A or on Processor B instigated the traversal. Stated differently, once the octrees 700 and 750 converge, the child nodes in the lower levels of the octrees map to virtual memory pages that are also shared by the processors.

Many computing systems (e.g., network devices) include multiple processors and threads that share the address space. By sharing the child nodes corresponding to the shared address space—e.g., the shared portions of the virtual memory map—memory consumption is significantly reduced when compared to a system where each processor maintains an independent page table. That is, by using N-ary trees to map virtual address space where the trees converge when the threads of the respective processors share the same address space, the amount of memory occupied by the N-ary trees is reduced relative to storing an independent (i.e., non-overlapping) N-ary tree for each of the processors. Additionally, when updating the locations of tables in memory when performing, for example, an In-System Software Upgrade (ISSU) on systems with live traffic, the number of locations modified in the in-memory page table is reduced when the two or more of the N-ary trees, which are used to represent the page table, converge and share one or more child nodes. As a result, this may reduce the time required to perform the software upgrade.

Figure 8:
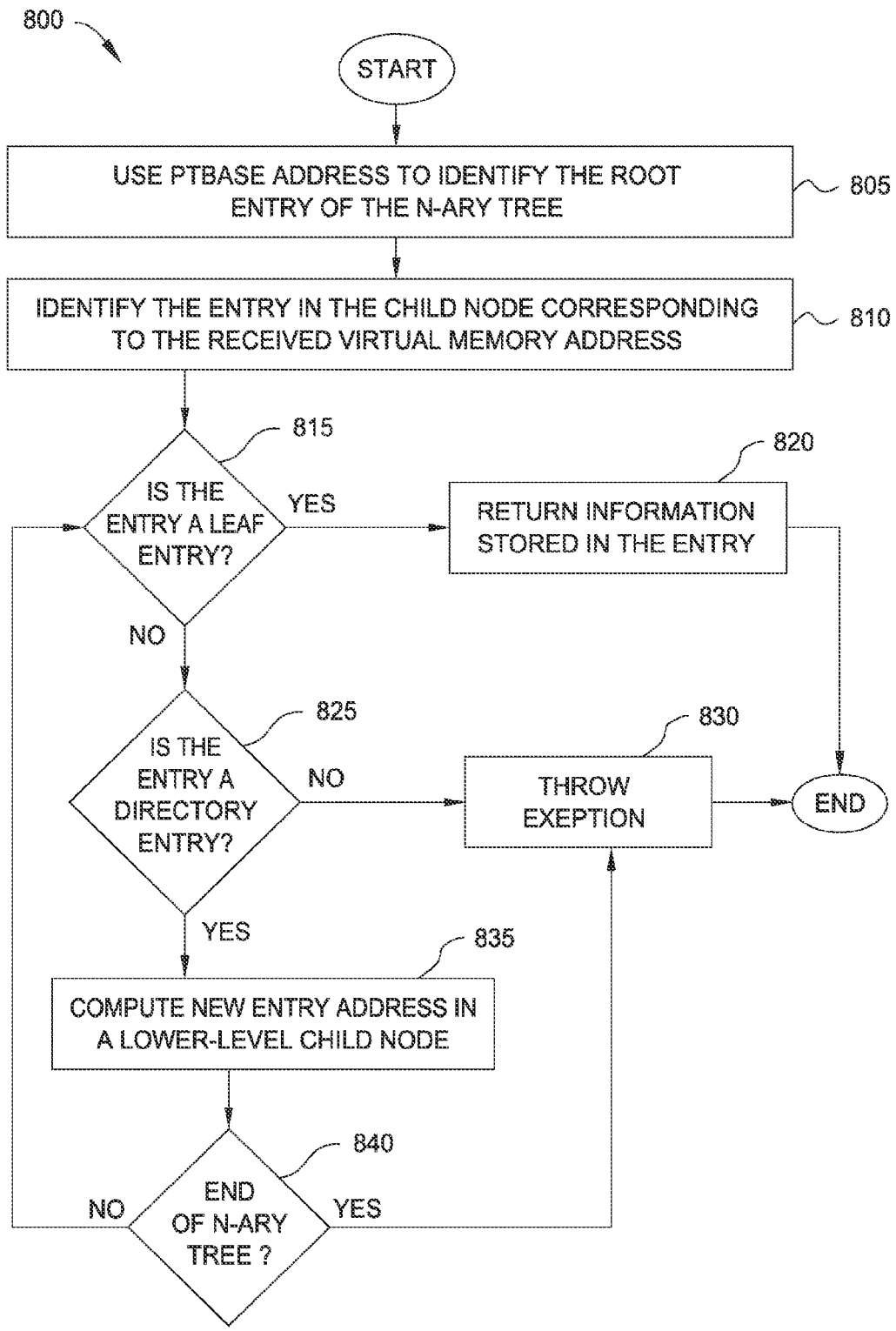
FIG. 8 illustrates a method for traversing an N-ary tree, according to one embodiment described herein.

FIG. 8 illustrates a method 800 for traversing an N-ary tree, according to one embodiment described herein. Various agents in a processing core (e.g., a thread, DMA engines, prefix lookup units, or hashed table lookup units) use virtual addresses. In order to access main memory, these virtual memory addresses are converted to physical memory addresses by, for example, the MMU. For chip area and power reasons, the MMU may only store a fraction of the memory mappings defined in the software architecture. Therefore, in response to request to translate a virtual address that does not match any of the available mappings stored in the MMU, the MMU may use a finite state machine in the page table walker circuit to traverse (or walk) the in-memory full page mapping table to retrieve the necessary data to perform the memory translation. As shown in FIGS. 4, 6, and 7, the full page mapping table may be implemented using an N-ary tree.

To traverse the N-ary tree, method 800 begins at block 805 where the page table walker circuit uses the PTBASE address to identify the root entry of the N-ary tree. The root entry may include a pointer to the first child node of the tree. Moreover, the root entry may specify whether the individual entries in the child node are global entries (i.e., shared by all the threads on a particular processor or multiple processors) or per-thread entries which may contain one or more sub-entries designated for a specific thread.

At block 810, the page table walker circuit identifies the entry in the child node corresponding to the received virtual memory address. For example, the walker circuit may use one or more of the most significant bits in the virtual address in order to select one of the entries in the child node. At block 815, the walker circuit determines if the selected entry is a leaf entry. To do so, the entry may store a TYPE field that identifies it as a leaf entry. If the entry is a leaf entry, at block 820, the page table walker circuit retrieves data stored in the leaf entry in order to update the MMU so that the MMU can translate the received virtual memory address into the corresponding physical memory address. In one embodiment, the walker circuit retrieves the physical address number which is used in the MMU to replace a range of virtual address bits when converting a virtual address to a physical address. The leaf entry may also include attribute data such as access permissions, memory ordering controls, the page size, and the physical address number that is also returned to the MMU. With this information, the MMU can then complete the virtual to physical memory translation requested by the agent.

However, if the entry is not a leaf entry, method 800 continues to block 825 where the page table walker circuit determines if the entry is a directory entry by evaluating the TYPE field. If not, at block 830, walker circuit throws an exception indicating something is wrong with the N-ary tree. If the entry is a directory entry, however, method 800 proceeds to block 835 where the walker circuit uses the information stored in the directory entry to determine a new entry address in a lower-level child node.

To determine the new entry address, the walker circuit may extract the value stored in the CHILD OFFSET field which indicates the offset from the current entry to the base address of the lower-level child node. The circuit may then use a group of the next most significant bits in the received virtual memory address to select one of the entries in the child node. Furthermore, the walker circuit may also evaluate the G0-G7 fields to determine if the selected entry is a global entry or a per-thread entry. If the entry is per-thread, the page table walker circuit uses the thread ID corresponding to the virtual memory address to select a sub-entry within the selected entry.

At block 840, the page table walker circuit determines if the end of the N-ary tree has been reached. For example, the walker circuit may maintain a count that is compared to a pre-defined limit which represents the maximum depth of the N-ary tree supported by the processor architecture, or the minimum page size. If the count has reached the pre-defined limit, method 800 returns to block 830 where the walker circuit throws an exception that informs the agent that the requested address translation was not performed because there were no leaf entries found within the maximum depth of the N-ary tree. However, if the page table walker circuit has not reached the end of the N-ary tree, method 800 returns to block 815 to determine if the selected entry (or sub-entry) is a leaf entry. As such, method 800 continues until the received virtual address is mapped to a particular leaf entry or an exception is thrown.

Reference is made to embodiments presented in this disclosure. However, the scope of the present disclosure is not limited to specific described embodiments. Instead, any combination of the above features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The embodiments herein may be a system, a method, and/or a computer program product. The computer program product may include a computer readable storage medium (or media) having computer readable program instructions thereon for causing a processor to carry out aspects disclosed herein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A memory management unit (MMU) configured to translate a virtual memory address to a physical memory address, the MMU comprising:
   MMU control logic configured to:
      access a root entry of an N-ary tree that maps the virtual memory address to a virtual address space, wherein N is a power of two, and wherein the root entry is accessed first when traversing the N-ary tree in order to translate the virtual memory address;
      access one of an N number of entries in a first child node of the N-ary tree based on the virtual memory address and information stored in the root entry;
      upon determining the one entry in the first child node is a leaf entry, update the MMU with information stored in the leaf entry to enable the MMU to translate the virtual memory address into the physical memory address; and
      upon determining the one entry in the first child node is a non-leaf entry, access one of an N number of entries in a second child node of the N-ary tree based on the virtual memory address and information stored in the non-leaf entry, wherein the information stored in the non-leaf entry comprises a data field indicating that the non-leaf entry is one of: globally accessible by threads executing on a processor and accessible only on a per-thread basis.

2. The MMU of claim 1, wherein beginning to traverse the N-ary tree by accessing the root entry of the N-ary tree is done in response to determining the MMU does not contain sufficient information to translate the virtual memory address into the physical memory address.

3. The MMU of claim 1, wherein the MMU is configured to use the information stored in the leaf entry to identify a virtual memory page in the virtual address space.

4. The MMU of claim 1, wherein the control logic is configured to continue to access different child nodes of the N-ary tree until the leaf entry is identified thereby terminating a traversal of the N-ary tree, wherein the different child nodes are each located at a different level of the N-ary tree.

5. The MMU of claim 1, wherein the first and second child nodes are in different levels of the N-ary tree, where the N number of entries in the first child node correspond to first virtual memory pages in the virtual address space and the N number of entries in the second child node correspond to second virtual memory pages in the virtual address space, wherein the first virtual memory pages are larger than the second virtual memory pages.

6. The MMU of claim 1, wherein the control logic is configured to translate the virtual memory address to the physical memory address for one of a plurality of processing cores in the processor, and wherein the physical address of the root entry in memory is stored in a page table base (PTBASE) register.

7. A method, comprising:
   receiving a request at an MMU to translate a virtual memory address to a physical memory address;
   accessing a root entry of an N-ary tree that maps the virtual memory address to a virtual address space, wherein N is a power of two, and wherein the root entry is accessed first when traversing the N-ary tree in order to translate the virtual memory address;
   accessing one of an N number of entries in a first child node of the N-ary tree based on the virtual memory address and information stored in the root entry;
   upon determining the one entry in the first child node is a leaf entry, updating the MMU with information stored in the leaf entry to enable the MMU to translate the virtual memory address into the physical memory address; and
   upon determining the one entry in the first child node is a non-leaf entry, accessing one of an N number of entries in a second child node of the N-ary tree based on the virtual memory address and information stored in the non-leaf entry, wherein the information stored in the non-leaf entry comprises a data field indicating that the non-leaf entry is one of: globally accessible by threads executing on a processor and accessible only on a per-thread basis.

8. The method of claim 7, wherein beginning to traverse the N-ary tree by accessing the root entry of the N-ary tree is done in response to determining the MMU does not contain sufficient information to translate the virtual memory address into the physical memory address.

9. The method of claim 7, further comprising identifying a virtual memory page in the virtual address space based on the information stored in the leaf entry.

10. The method of claim 7, further comprising continuing to access different child nodes of the N-ary tree until the leaf entry is reached thereby terminating a traversal of the N-ary tree, wherein the different child nodes are each located at a different level of the N-ary tree.

11. The method of claim 7, wherein the first and second child nodes are in different levels of the N-ary tree, where the N number of entries in the first child node correspond to first virtual memory pages in the virtual address space and the N number of entries in the second child node correspond to second virtual memory pages in the virtual address space, wherein the first virtual memory pages are larger than the second virtual memory pages.

12. A non-transitory computer program product, comprising:
   computer-readable program code configured to:
      receive a request to translate a virtual memory address to a physical memory address using a MMU;
      access a root entry of an N-ary tree that maps the virtual memory address to a virtual address space, wherein N is a power of two, and wherein the root entry is accessed first when traversing the N-ary tree in order to translate the virtual memory address;
      access one of an N number of entries in a first child node of the N-ary tree based on the virtual memory address and information stored in the root entry;
      upon determining the one entry in the first child node is a leaf entry, update the MMU with information stored in the leaf entry to enable the MMU to translate the virtual memory address into the physical memory address; and
      upon determining the one entry in the first child node is a non-leaf entry, access one of an N number of entries in a second child node of the N-ary tree based on the virtual memory address and information stored in the non-leaf entry, wherein the information stored in the non-leaf entry comprises a data field indicating that the non-leaf entry is one of: globally accessible by threads executing on a processor and accessible only on a per-thread basis; and
   a computer readable medium that stores the computer-readable program code.

13. The computer program product of claim 12, wherein beginning to traverse the N-ary tree by accessing the root entry of the N-ary tree is done in response to determining the MMU does not contain sufficient information to translate the virtual memory address into the physical memory address.

14. The computer program product of claim 12, wherein the program code is configured to identify a virtual memory page in the virtual address space based on the information stored in the leaf entry.

15. The computer program product of claim 12, wherein the program code is configured to continue to access different child nodes of the N-ary tree until the leaf entry is reached thereby terminating a traversal of the N-ary tree, wherein the different child nodes are each located at a different level of the N-ary tree.

16. The computer program product of claim 12, wherein the first and second child nodes are in different levels of the N-ary tree, where the N number of entries in the first child node correspond to first virtual memory pages in the virtual address space and the N number of entries in the second child node correspond to second virtual memory pages in the virtual address space, wherein the first virtual memory pages are larger than the second virtual memory pages.

17. The computer program product of claim 12, wherein the N-ary tree includes at least one child node that is shared by a different N-ary tree, wherein the at least one child node maps to a portion of the virtual address space that is shared by threads executing on different processors.

* * * * *